(12) United States Patent
Bucknell et al.

(10) Patent No.: US 8,328,491 B2
(45) Date of Patent: Dec. 11, 2012

(54) FASTENERS AND SPACER RINGS THEREFOR

(75) Inventors: John Wentworth Bucknell, Indooroopilly (AU); Robert Wentworth Bucknell, Daisy Hill (AU)

(73) Assignee: Technofast Industries Pty. Ltd., Richlands, Queensland (AU)

( * ) Notice: Subject to any disclaimer, the term of this patent is extended or adjusted under 35 U.S.C. 154(b) by 492 days.

(21) Appl. No.: 12/447,752

(22) PCT Filed: Oct. 11, 2007

(86) PCT No.: PCT/AU2007/001550
§ 371 (c)(1),
(2), (4) Date: Dec. 16, 2009

(87) PCT Pub. No.: WO2008/052245
PCT Pub. Date: May 8, 2008

(65) Prior Publication Data
US 2010/0135748 A1    Jun. 3, 2010

(30) Foreign Application Priority Data
Oct. 31, 2006    (AU) ................. 2006906043

(51) Int. Cl.
*F16B 43/00*    (2006.01)
(52) U.S. Cl. ........................ 411/535; 411/432
(58) Field of Classification Search .......... None
See application file for complete search history.

(56) References Cited

U.S. PATENT DOCUMENTS

| | | | | |
|---|---|---|---|---|
| 1,746,978 A * | 2/1930 | Winkler | | 411/536 |
| 3,285,568 A * | 11/1966 | Biach | | 254/29 A |
| 4,708,555 A * | 11/1987 | Terry | | 411/149 |
| 5,190,423 A * | 3/1993 | Ewing | | 411/134 |
| 5,439,337 A * | 8/1995 | Kakimoto | | 411/240 |
| 5,474,409 A * | 12/1995 | Terry | | 411/134 |
| 6,966,735 B1 * | 11/2005 | Yamazaki | | 411/149 |

FOREIGN PATENT DOCUMENTS

| | | |
|---|---|---|
| DE | 2356604 | 5/1975 |
| DE | 19642446 | 4/1998 |
| DE | 19905706 | 9/2000 |
| EP | 131556 | 3/1988 |
| WO | WO94/01689 | 1/1994 |
| WO | WO2004/033139 | 4/2004 |
| WO | WO2005/123345 | 12/2005 |
| WO | WO2006/037173 | 4/2006 |

OTHER PUBLICATIONS

PCT/AU2007/001550, PC, Technofast Industries Pty. Ltd.

* cited by examiner

*Primary Examiner* — Gary Estremsky
(74) *Attorney, Agent, or Firm* — Duane Morris LLP

(57) ABSTRACT

An axially expanding spacer (10) has respective first and second spacer rings (11,12) with complementary helical ramped faces (16,17) and abutment faces (18,19). By relative rotation of the spacer rings (11,12), the height of the spacer (10), between annular faces (14,15) can be expanded or contracted. Compression springs (20) between the abutment faces (18,19) urge the spacer (10) to its "expanded" configuration.

13 Claims, 41 Drawing Sheets

FASTENERS AND SPACER RINGS THEREFOR

CROSS-REFERENCE TO RELATED PATENT APPLICATIONS

The present application is a U.S. national stage application under 35 U.S.C. §371 of PCT Application No. PCT/AU2007/001550, filed Oct. 11, 2007, the entirety of which is incorporated herein by reference.

BACKGROUND OF THE INVENTION

1. Field of the Invention

THIS INVENTION relates to fasteners and spacer rings therefor.

The invention particularly relates, but is not limited to, fasteners used in tensioning systems which employ hydraulic tensioning jacks.

2. Prior Art

The principles of applying bolt tensile loadings using hydraulic means to generate precise mounts of force are well known and established.

Examples of tensioning systems using hydraulic tensioning jacks are disclosed in International Publication WO 00/51791 (=International Application PCT/AU00/00138) and International Publication WO 2005/123345 (=International Application PCT/AU2005/000877), both in the name of Bucknell, John Wentworth.

SUMMARY OF THE INVENTION

It is one preferred object of the present invention to an axially expanding spacer, mountable about a bolt being tensioned, between a nut engaged with the bolt and with a component to be clamped, the expanding spacer being axially extendible to take up a strain gap between the nut and the component as the bolt is tensioned by a tensile load.

It is an alternative preferred object of the present invention to provide an expanding spacer, mountable about the bolt being tensioned, where a portion of the expanding spacer is incorporated in a nut engaged about the bolt and the expanding spacer engages a component to be clamped, the expanding spacer being axially expandable to take up a strain gap between the nut and the component as the bolt is tensioned by a tensile load.

It is a further preferred object to provide such an expanding spacer where internal spring means urge respective spacer rings or portions of the spacer towards the axially expandable position to take up the strain gap.

It is a still further preferred object of the present invention to provide an internal collar to maintain the spacer rings or portions in co-axial alignment.

Other preferred objects of the present invention will become apparent from the following description.

In one aspect, the present invention resides in an expanding spacer to be mounted, about a bolt being tensioned, between a nut engaged with the bolt and with a component to be clamped, the expanding spacer having complementary first and second spacer rings, each of the spacer rings having a planar end face and helically ramped faces terminated by abutment faces, where the angle of inclination of the helically ramped faces to the planar end faces is selected so that there will be no relative rotational motion between the first and second spacer rings when the expanding spacer is interposed between the nut and the component, and a compressive load is applied to the expanding spacer.

In a second aspect, the present invention resides in an expanding spacer, to be mounted about a bolt being tensioned, incorporating a nut engageable with the bolt, and a spacer ring with a planar end face engageable with a component to be clamped, the nut and the spacer ring having complementary helically ramped faces terminated by abutment faces, where the angle of inclination of the ramped faces to the planar end face of the spacer ring selected so there will be no relative rotation or motion between the nut and the spacer ring when the expanding spacer is subject to a compressive load.

In alternative embodiments, an intermediate spacer ring may be interposed between the first and second spacer rings, or between the nut and the spacer ring, the intermediate spacer ring having oppositely-directed helically ramped faces terminated by abutment faces, where the inclination of the respective helically ramped faces is selected so that there will be no relative rotational motion between the intermediate spacer ring and the first and second spacer rings, or between the intermediate spacer ring and the nut and the spacer ring, when the expanding spacer is subject to a compressive load.

An annular collar may be provided within the expanding spacer to maintain the first and second spacer rings, or the nut and spacer ring (and/or the intermediate spacer ring) in axial alignment, as the compressive load is applied to the expanding spacer.

Preferably, the abutment faces lie on an axis perpendicular to the plane of the planar end faces (eg., parallel to the axis of the bolt); and recesses may be formed in the abutment faces to enable the insertion of a tool to selectively rotate the first and second spacer rings, or the spacer ring, and/or the intermediate spacer ring, between an expanded position when the bolt is being tensioned, and a "collapsed" position when the nut is to be rotated on the bolt to release the tension.

Compression springs may be mounted in, and extend from, the abutment faces to urge the expanding spacer to the expanded position.

Each spacer ring may be provided with two or more, but usually no more than three or four, helically ramped faces.

A typical angle of inclination of the helically ramped faces to the planar end face(s) is 13°, and preferably less than 25°. The actual angle of inclination will depend on the particular application for the expanding spacer. Where an intermediate spacer ring is used, the angle of inclination for the helically ramped faces may be halved (eg., 6.5°), although the intermediate spacer enables a quicker take-up of the strain gap for a given relative rotation of the spacer ring(s).

A peripheral flange may be provided around the second spacer ring, or spacer ring, to bear on the component and to be engaged by the bridge of a hydraulic jack operable to tension the bolt.

In a third aspect, the present invention resides in an expanding spacer, to be mounted about a bolt being tensioned, incorporating a nut engageable with the bolt, and a spacer ring with a planar face engageable with a component to be clamped; the nut and spacer ring having complementary respective external and internal screw threads to enable expansion and contraction of the expanding spacer by relative rotation of the spacer ring to the nut.

Preferably, the nut has secondary, preferably tapered, screw threads for engagement with a puller bar of a tensioning device.

BRIEF DESCRIPTION OF THE DRAWINGS

To enable the invention to be fully understood, the preferred embodiments will now be described with reference to the accompanying drawings in which.

DETAILED DESCRIPTION OF THE PREFERRED EMBODIMENTS

Figure 1A:
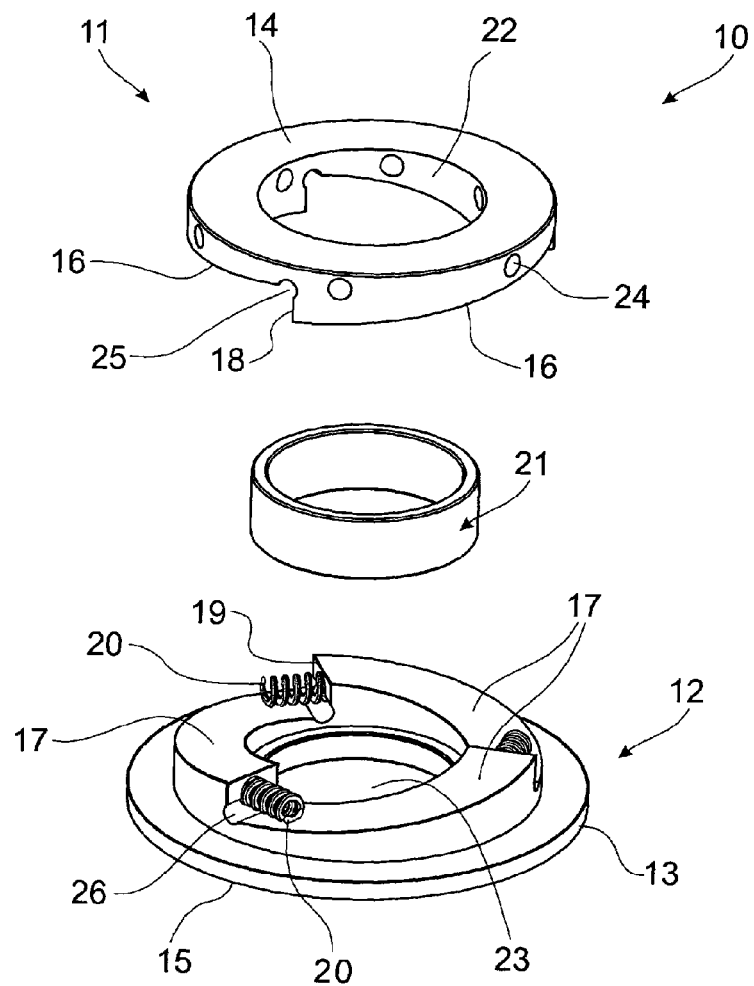
FIGS. 1(a) to (g) show exploded and assembled views of a first embodiment.
Figure 1B:
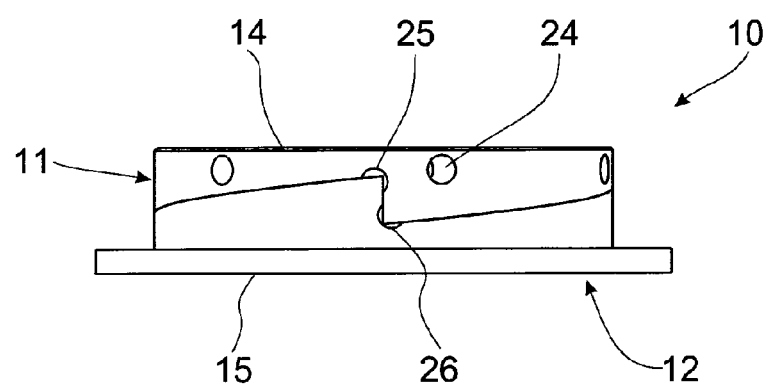
Figure 1C:
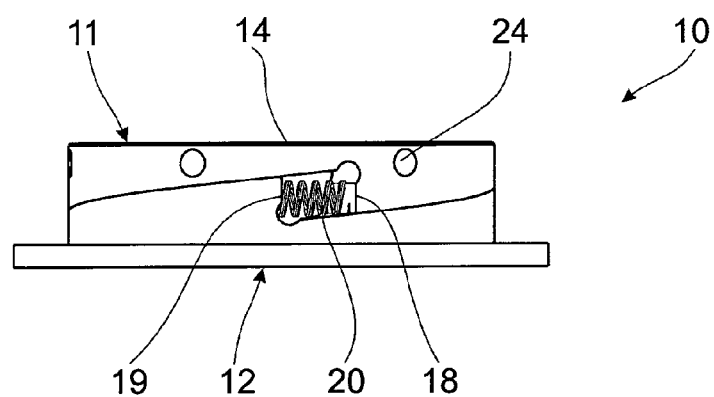
Figure 1D:
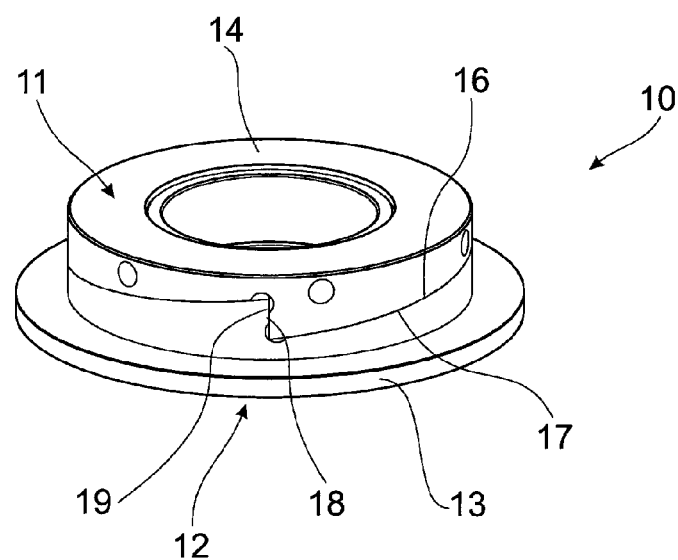
Figure 1E:
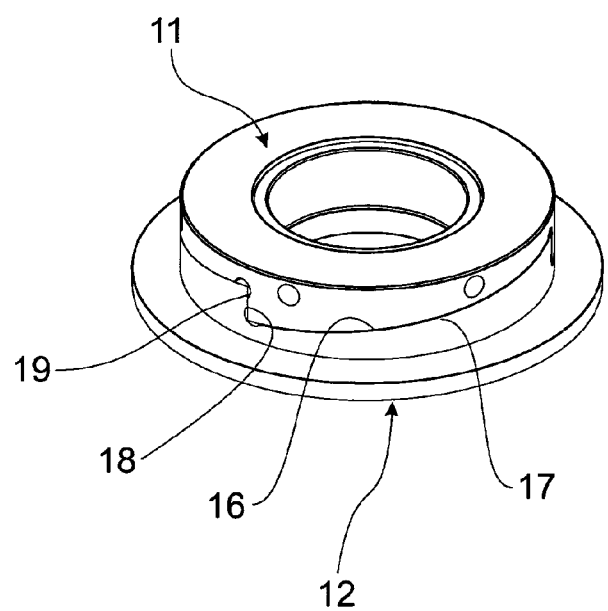
Figure 1F:
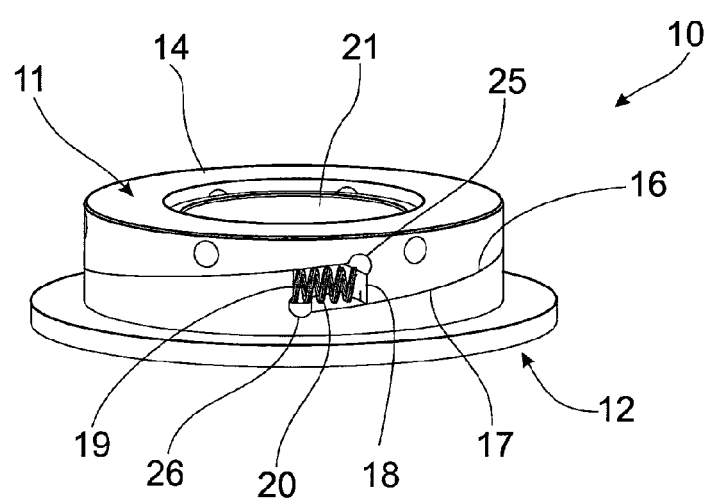
Figure 1G:
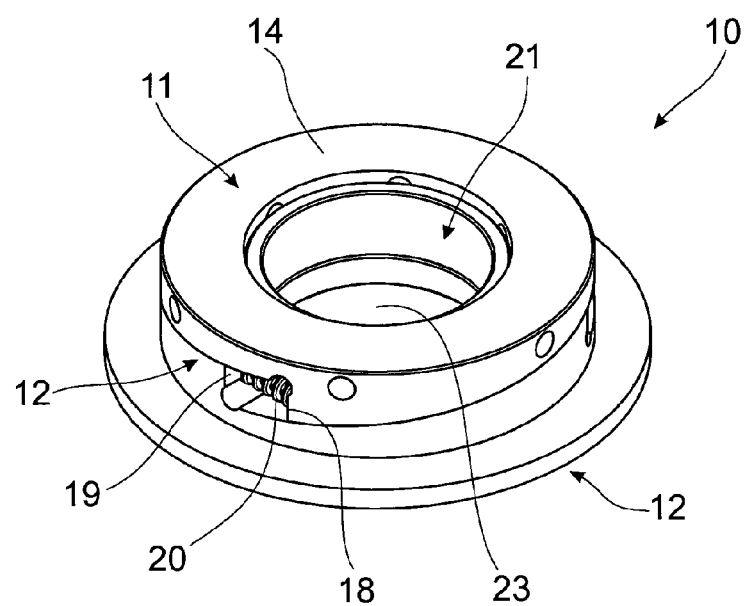

Referring to the first embodiment of FIGS. 1(a) to (g), the expanding spacer 10 is designed to be mounted about a bolt, and interposed between a nut and a component to be clamped (all not shown) where the bolt is to be tensioned using an hydraulic tensioning jack as disclosed in International Publication WO 00/51791 (Bucknell) as hereinbefore referred to. The operation of the hydraulic tensioning system disclosed in that International Publication, and of the tensioning system disclosed in International Publication WO 2005/123345 (Bucknell) is to be incorporated into this specification by reference.

The expanding spacer 10 has complementary first and second spacer rings 11, 12, where the second spacer ring 12 has a peripheral flange 13 engageable by the bridge of the hydraulic tensioning jack.

The first and second spacer rings 11, 12 have planar end faces 14, 15 engageable by the nut and the component to be clamped.

In this embodiment, the spacer rings 11, 12 have three helically ramped faces 16, 17 which are terminated by abutment faces 18, 19, respectively.

In the embodiment illustrated, the helically ramped faces 16, 17 are inclined at an angle of inclination of approximately 13° to the planar end faces 14, 15.

Compression coil springs 20 are mounted in, and extend from, the abutment faces 19 of the second spacer ring 12 to engage the opposed abutment faces 18 of the first spacer ring 11 to urge the expanding spacer 10 to rotate to an "expanded" position where the expanding spacer 10 fills a strain gap between the nut and the component to be clamped as the bolt is tensioned by the hydraulic jack.

An annular collar is received in the bores 22, 23 in the spacer rings 11, 12 to maintain the spacer rings 11, 12 in co-axial alignment as they rotate relative to each other.

Holes 24 are provided in the first spacer ring 11 for engagement by a tool to enable relative rotation of the first and second spacer rings 11, 12, eg., to move the expanding spacer to its "collapsed" position when the nut is to be rotated on the bolt to enable the tension on the bolt to be reduced.

In addition, recesses 25, 26 are formed in the abutment faces 18, 19 (or at the junction of abutment faces 18, 19 with the adjacent helically ramped faces 16, 17) to enable engagement by a tool to enable the spacer rings 11, 12 to be rotated relative to each other to expand or contract the expanding spacer 10.

Figure 2A:
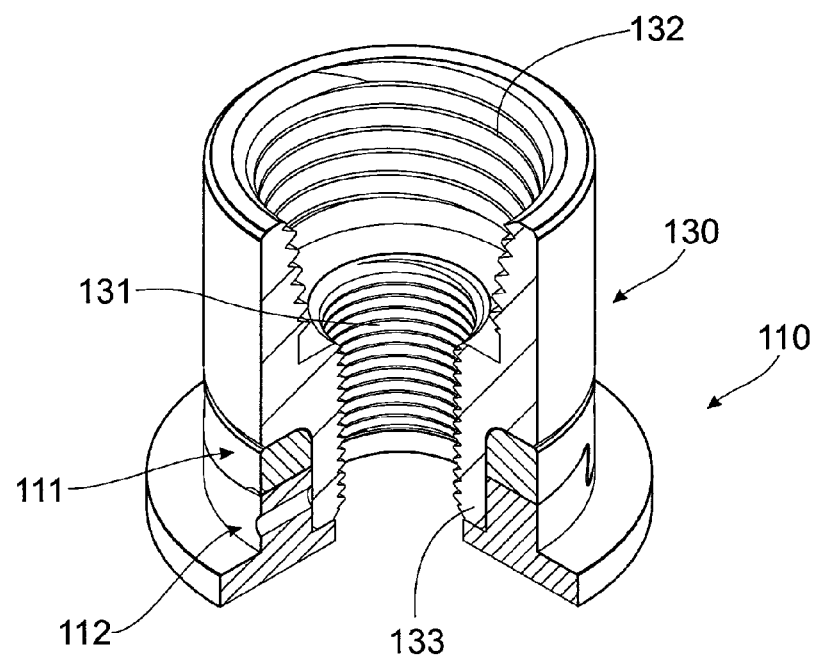
FIGS. 2(a) to (c) show sectional views of a second embodiment.
Figure 2B:
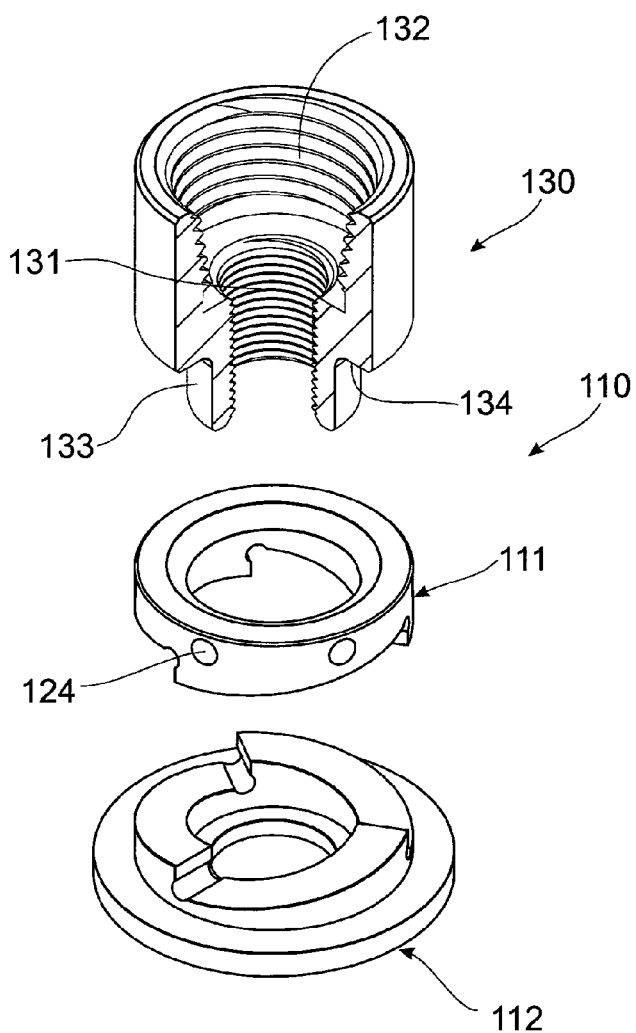
Figure 2C:
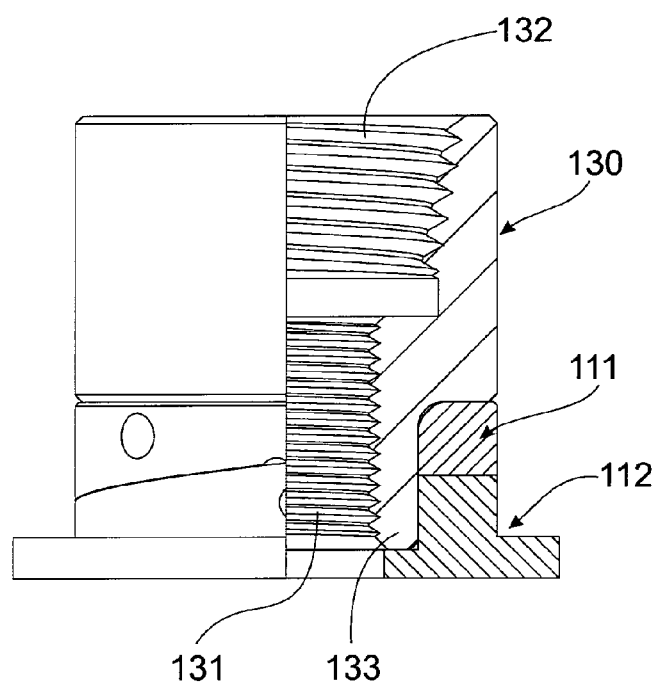
Figure 3A:
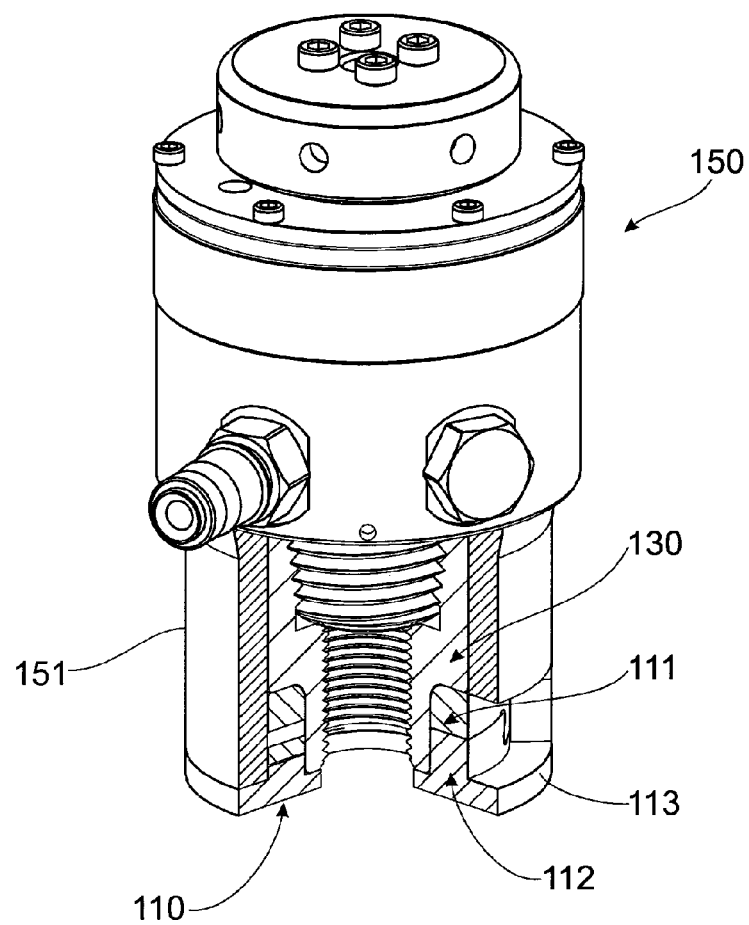
FIGS. 3(a) to (f) show the operation of the second embodiment of the expanding spacer in the tensioning system employing a hydraulic jack.
Figure 3B:
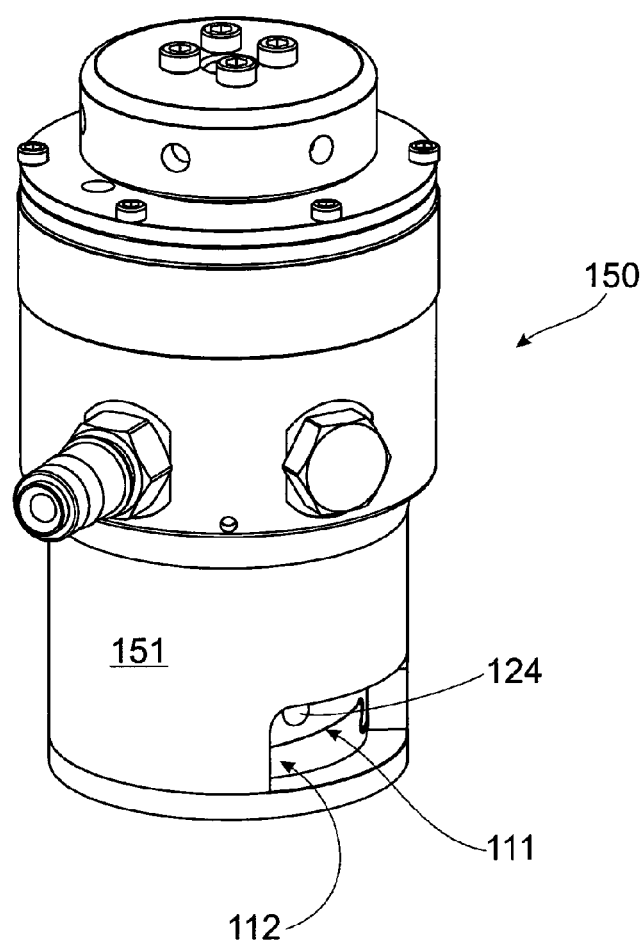
Figure 3C:
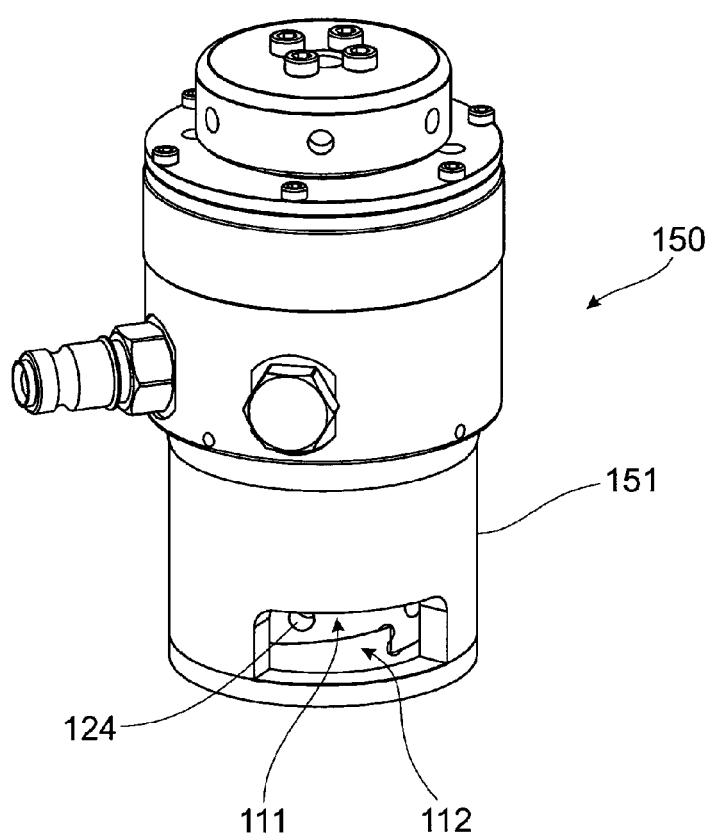
Figure 3D:
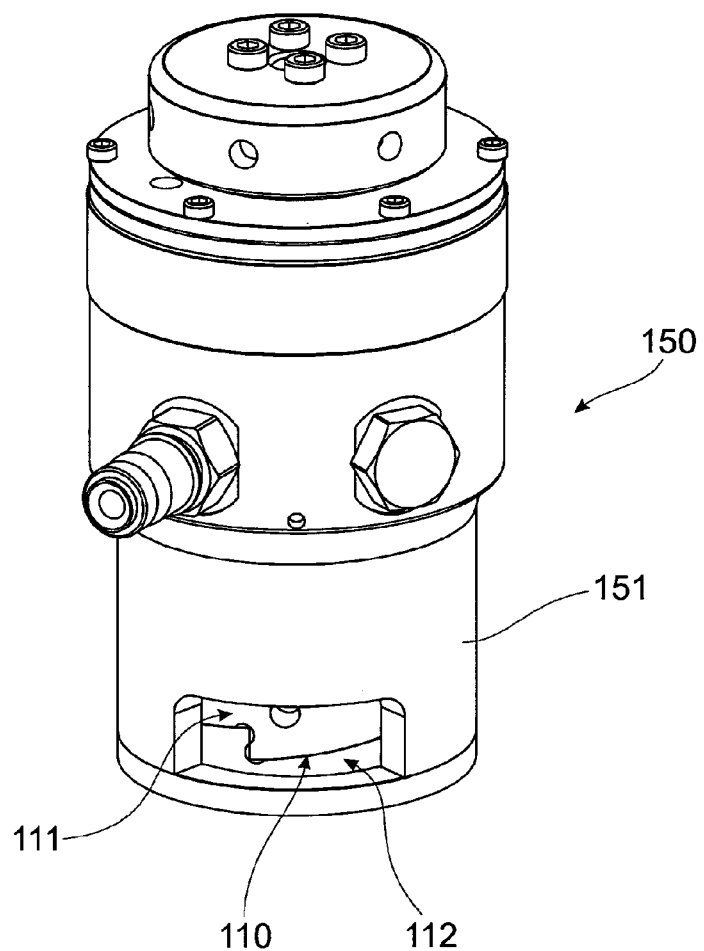
Figure 3E:
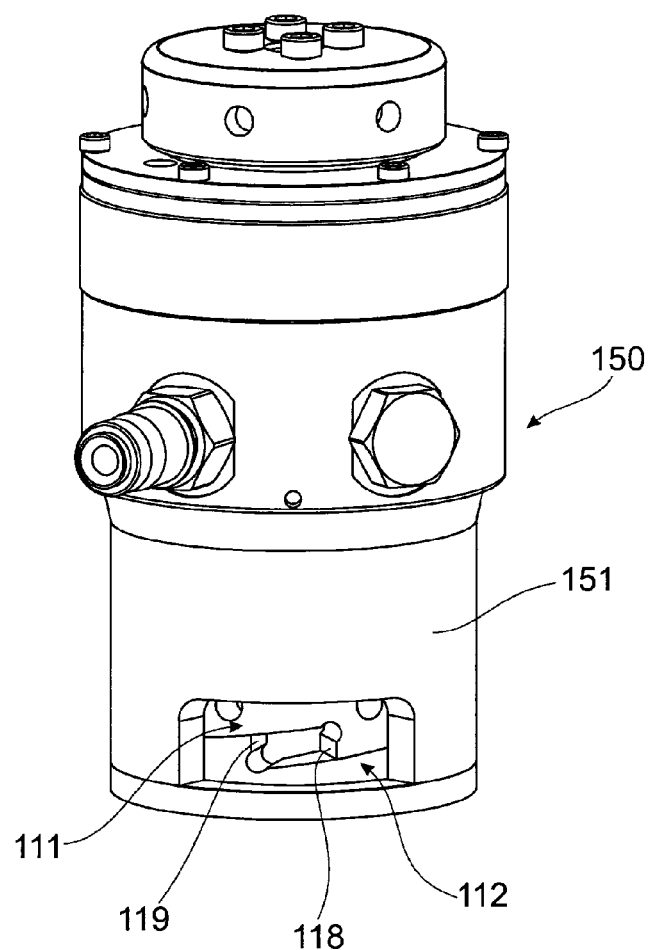
Figure 3F:
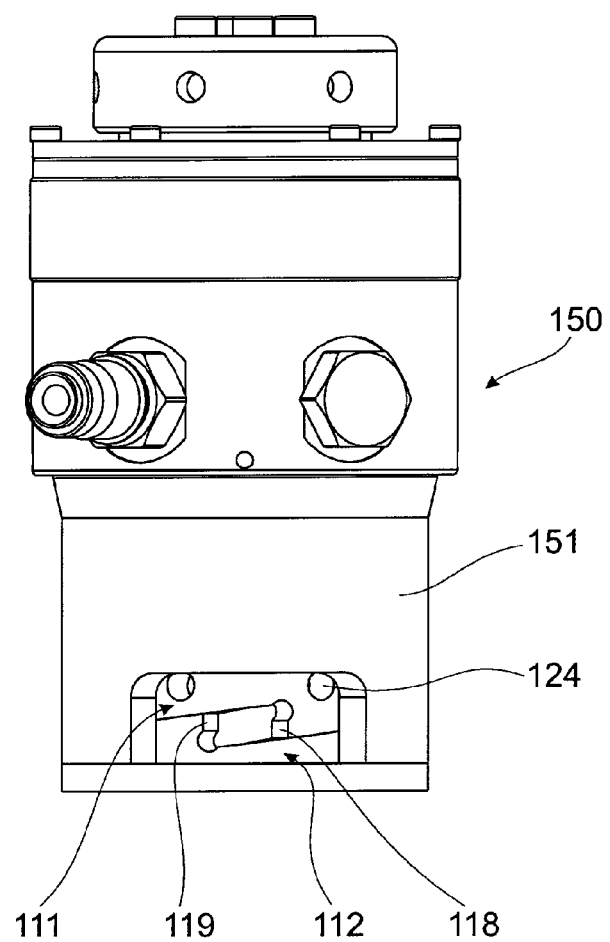
Figure 4A:
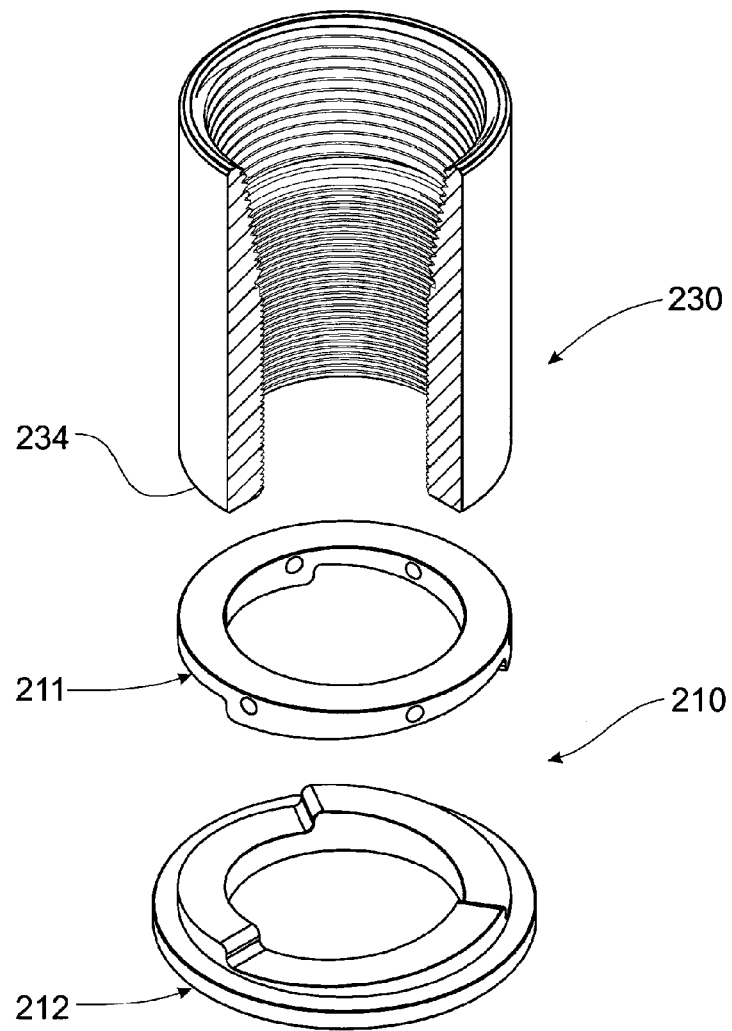
FIGS. 4(a) to (d) show part-sectional views of a third embodiment of the spacer.
Figure 4B:
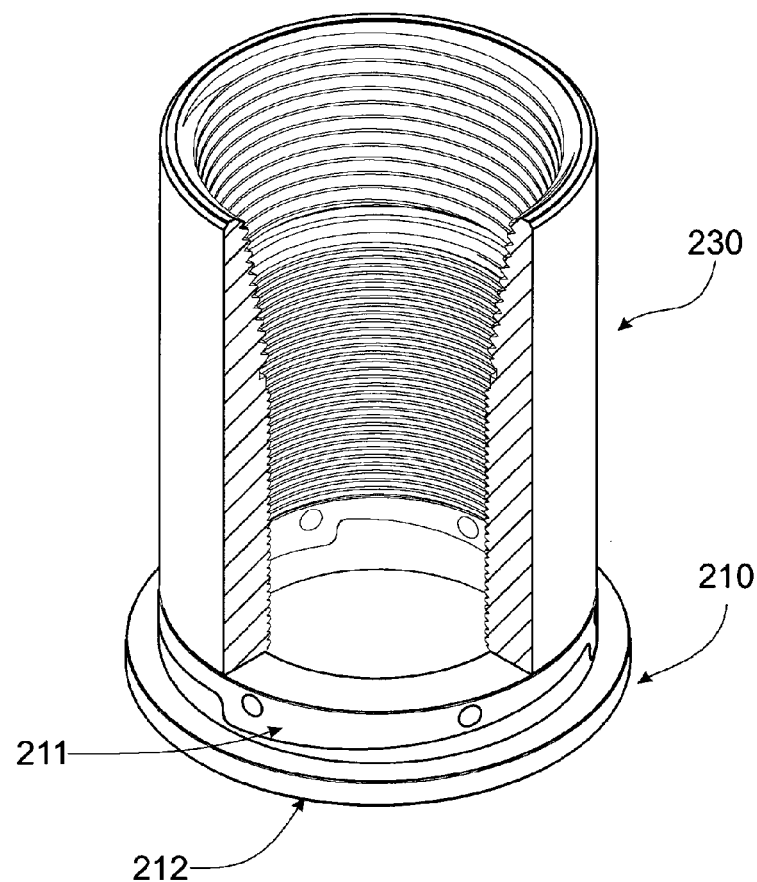
Figure 4C:
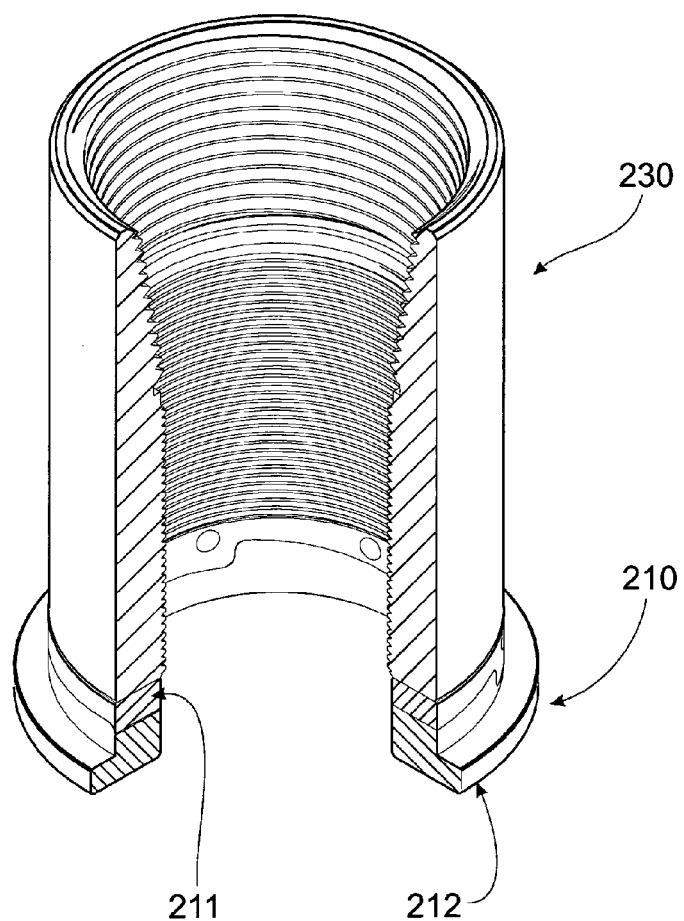
Figure 4D:
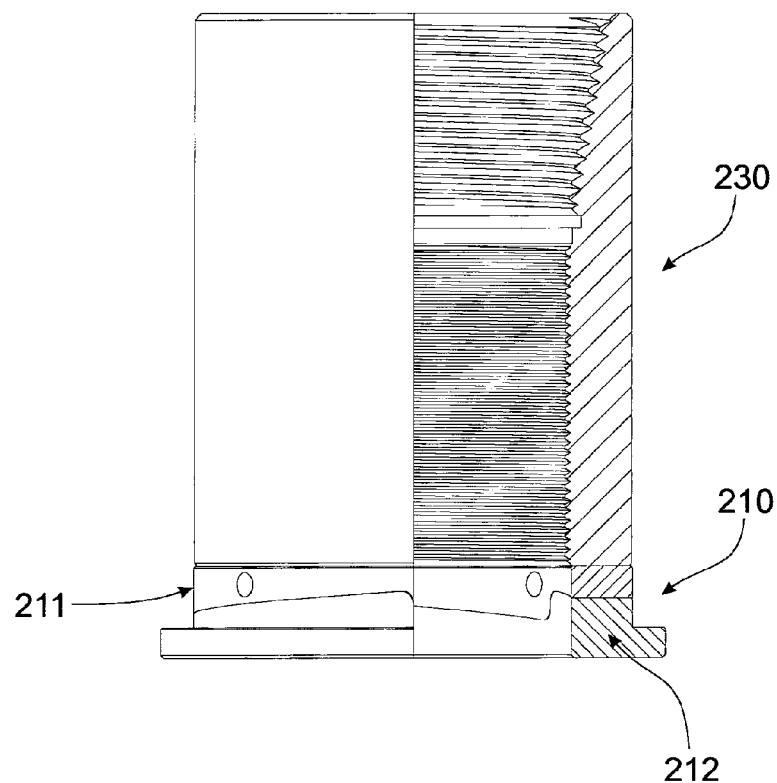
Figure 5A:
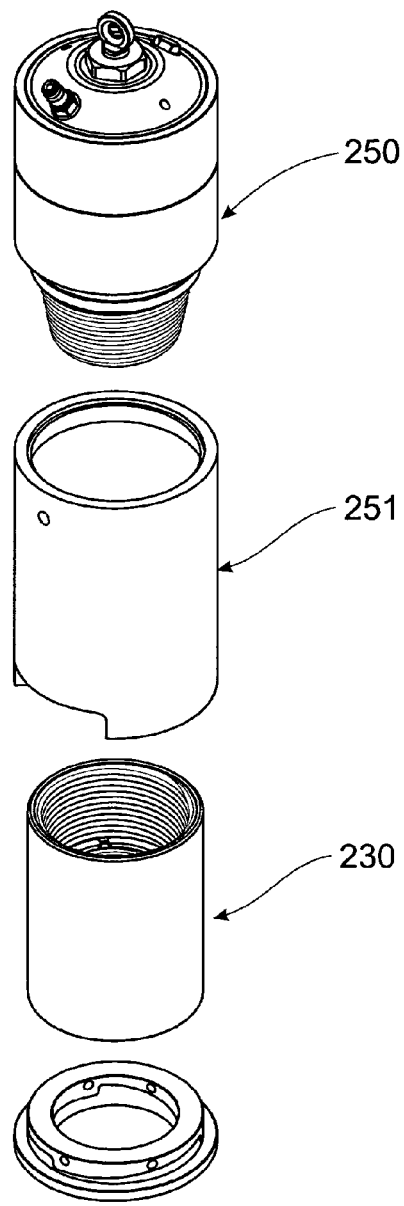
FIGS. 5(a) to (d) show the use of the spacer with a hydraulic jack.
Figure 5B:
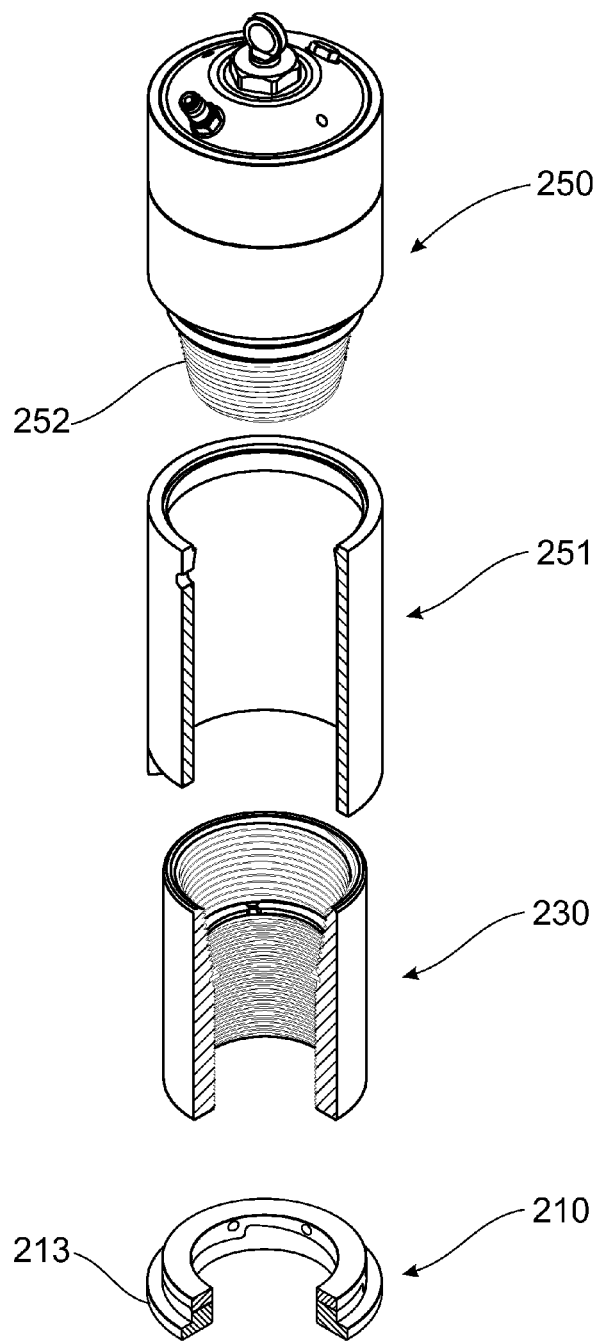
Figure 5C:
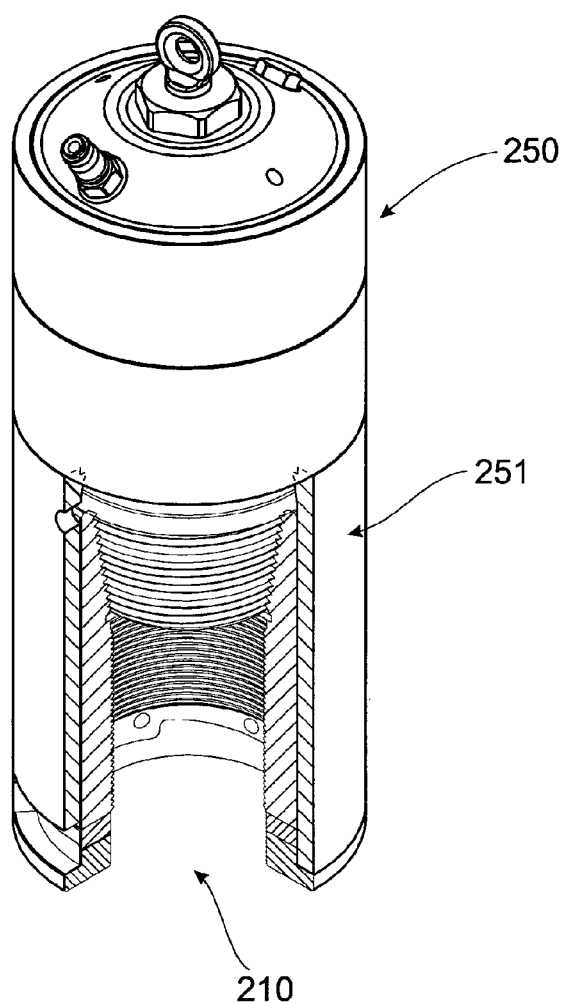
Figure 5D:
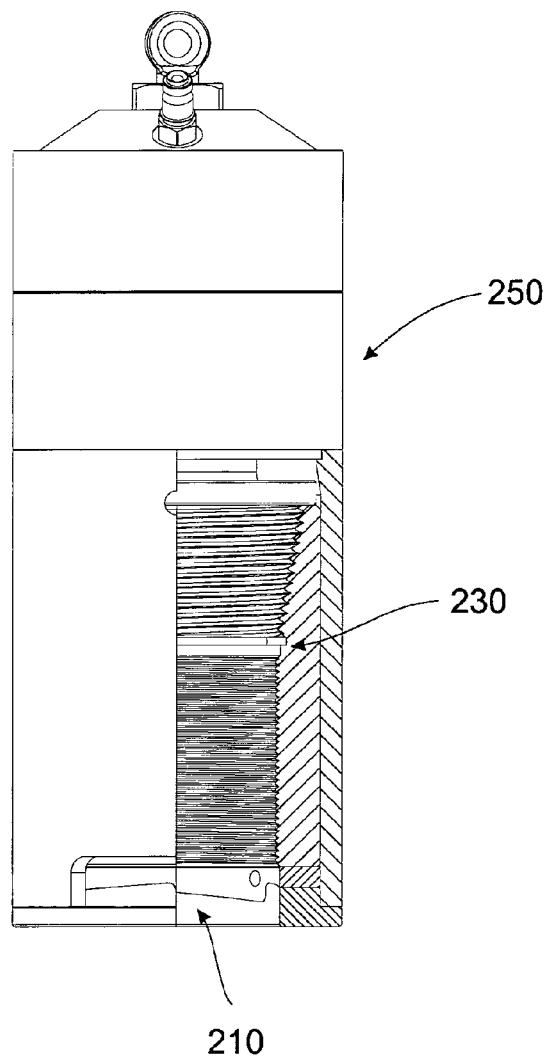
Figure 6A:
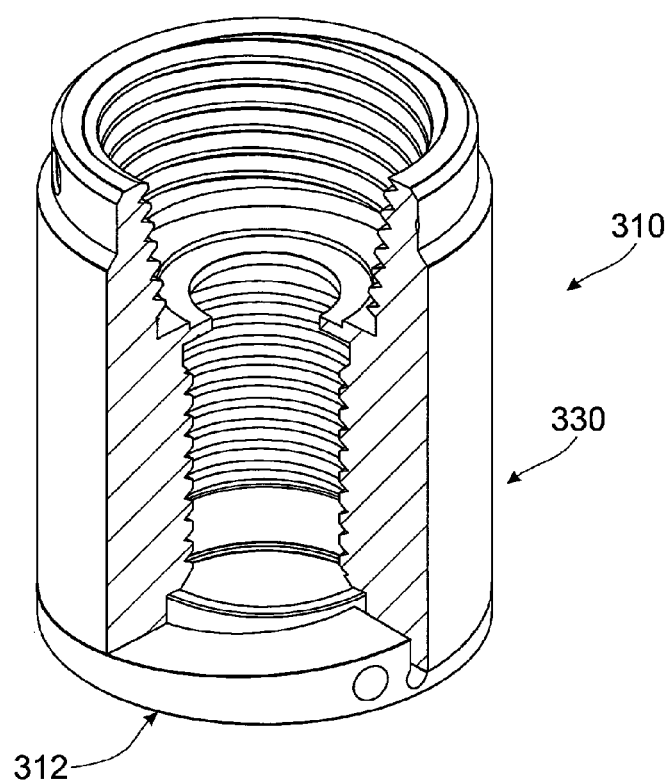
FIG. 6(a) to (d) shows assembled and exploded views of a fourth embodiment.
Figure 6B:
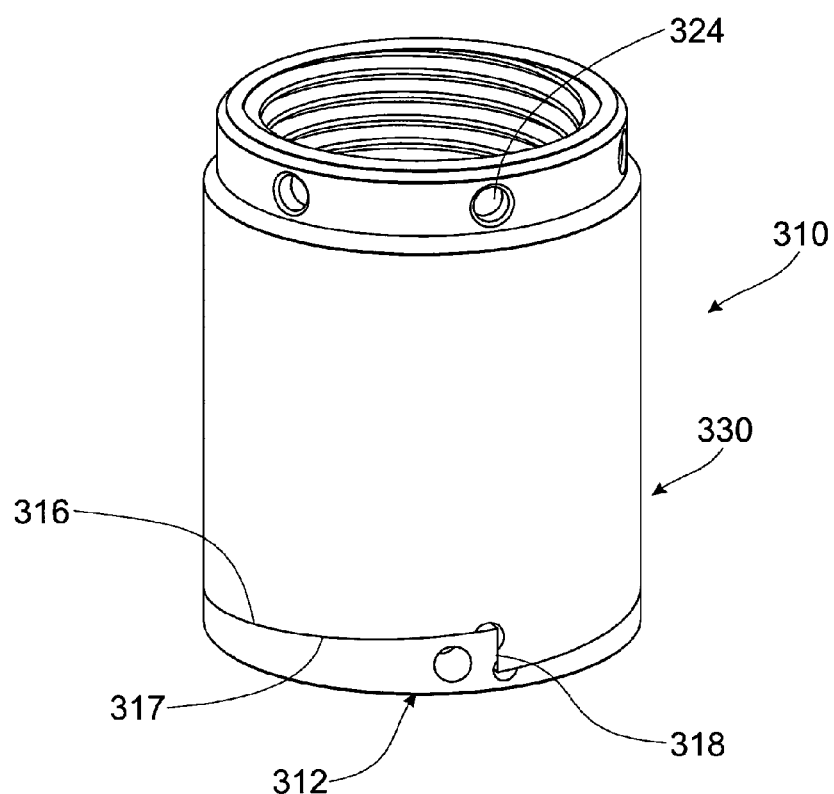
Figure 6C:
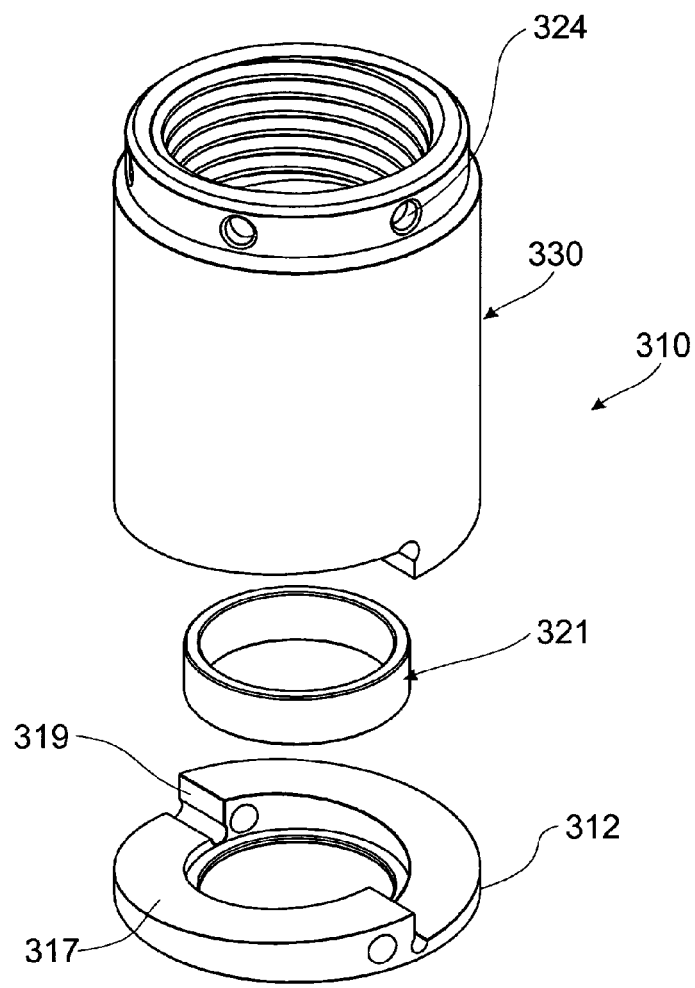
Figure 6D:
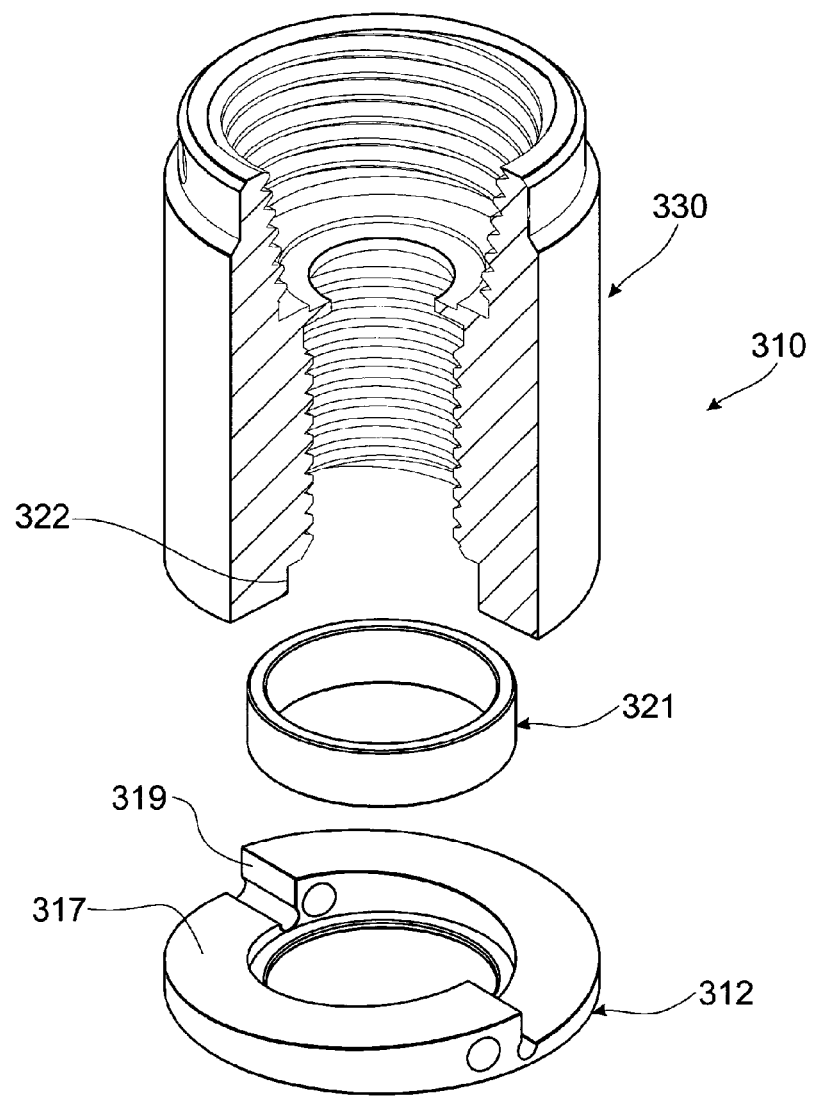
Figure 7A:
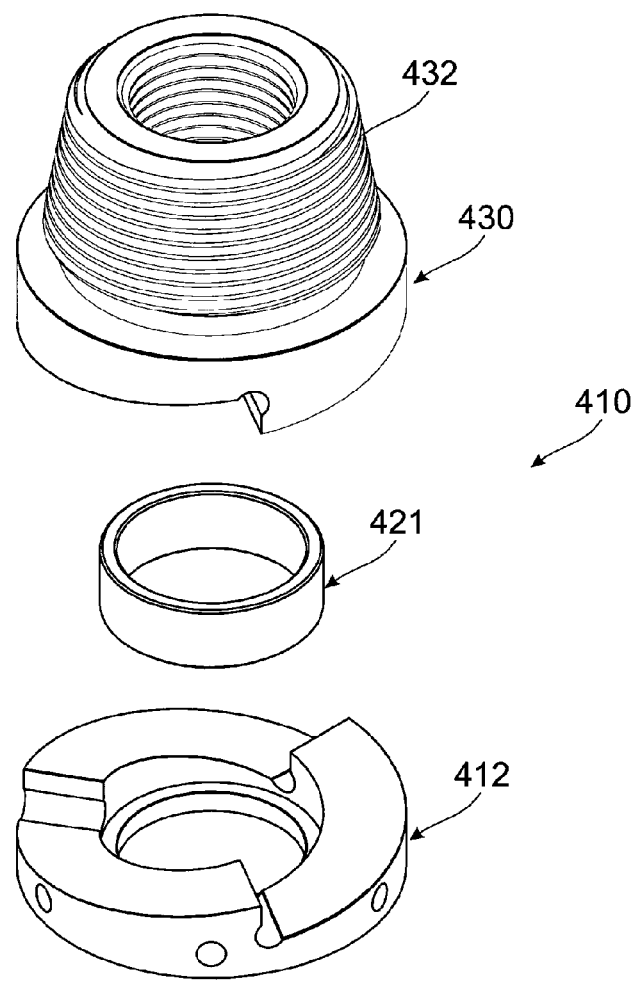
FIGS. 7(a) to (d) shows similar views of a fifth embodiment.
Figure 7B:
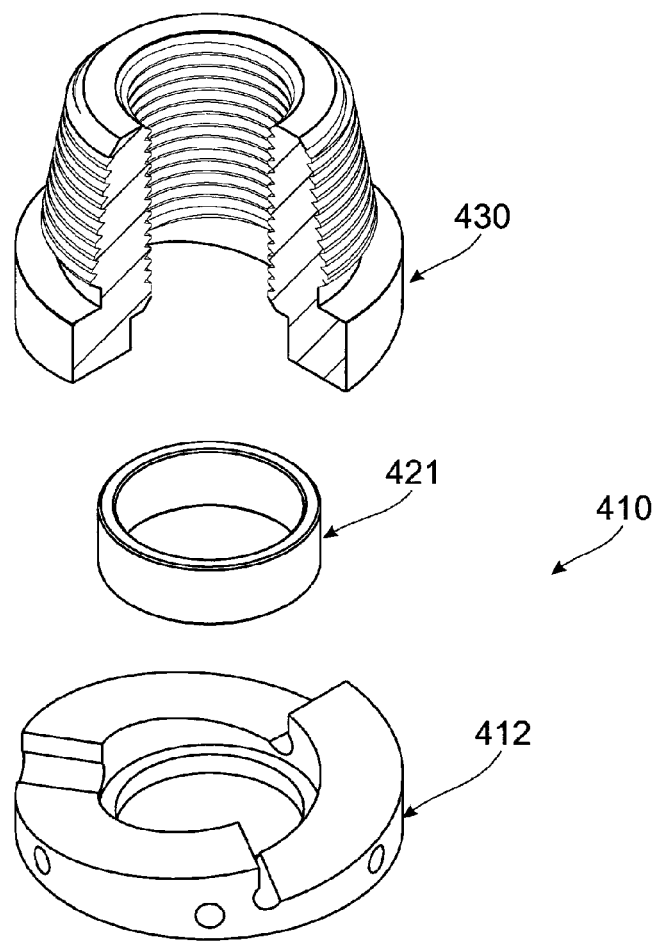
Figure 7C:
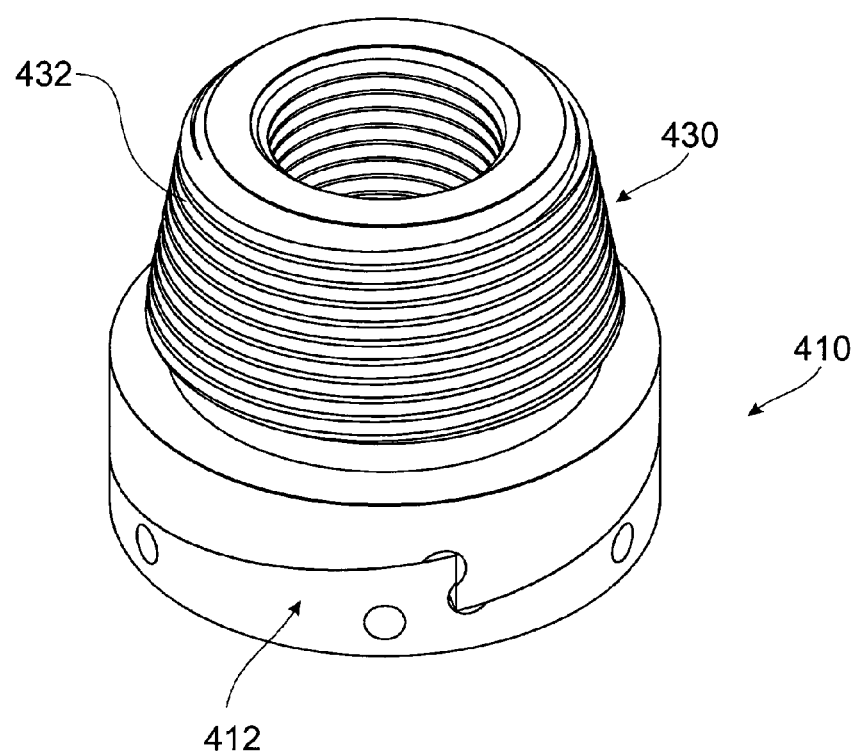
Figure 7D:
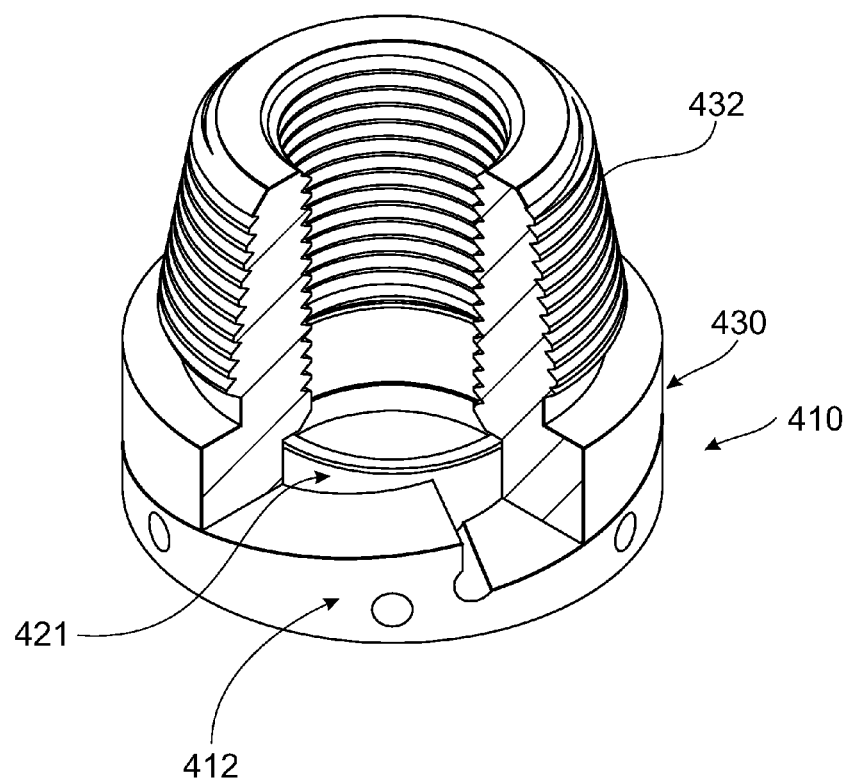
Figure 7E:
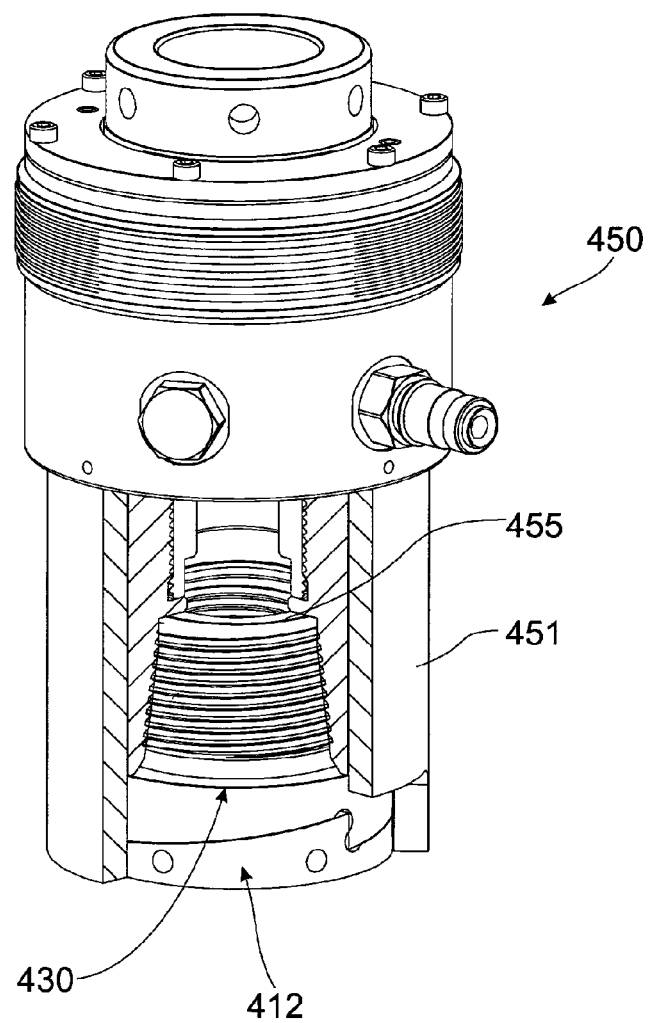
FIGS. 7(e) to (g) show the use of the spacer in a tensioning system with a hydraulic jack.
Figure 7F:
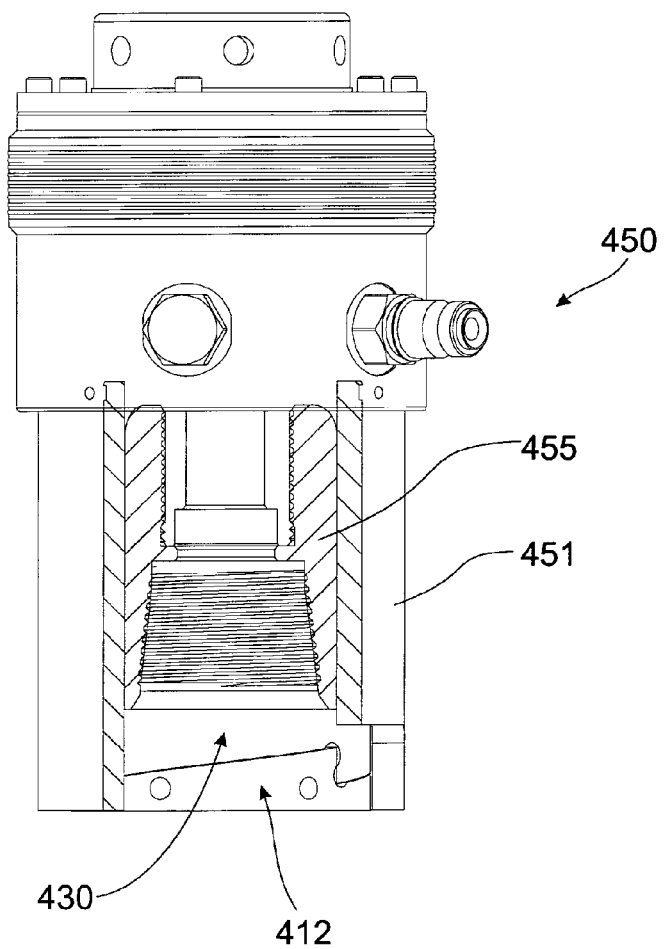
Figure 7G:
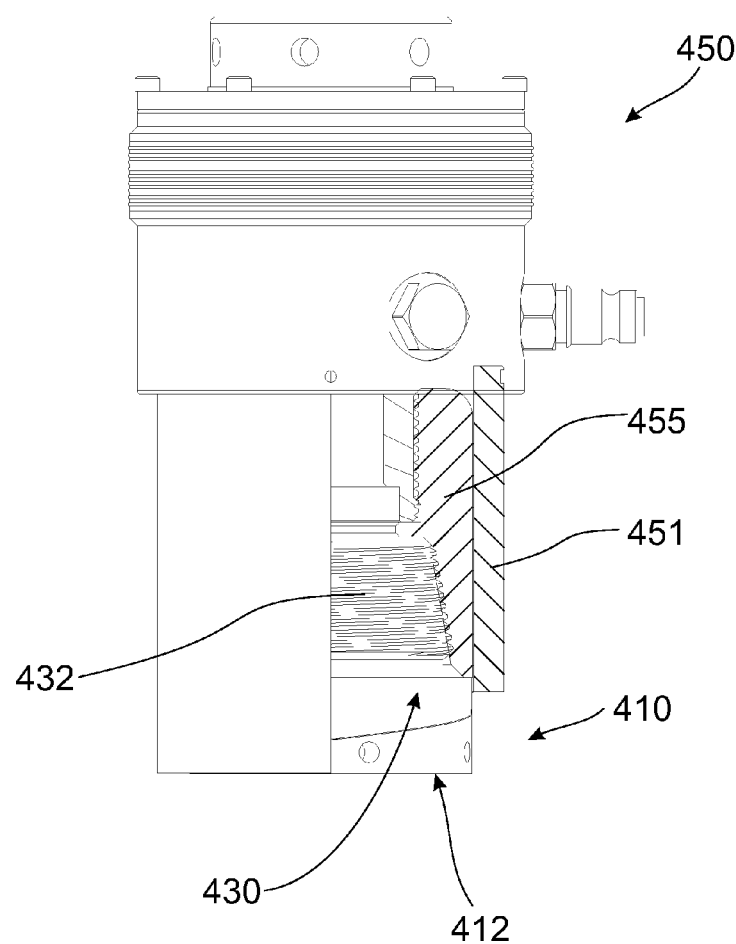

Referring to the second embodiment of FIGS. 2(a) to (c), the expanding spacer 110 has first and second spacer rings 111, 112 of the same configuration as the spacer rings 11, 12 of expanding spacer 10. However, in this second embodiment, the nut 130, which has a screw threaded bore 131 to engage the bolt (not shown) and a "quick start" tapered bore 132 to receive a complementary puller bar on a hydraulic jack (not shown), has an annular extension 133 which is received within the spacer rings 111, 112 to maintain them in co-axial alignment in the manner of the annular collar 21 of the expanding spacer 10.

Referring to FIGS. 3(a) to (f), the expanding spacer 110 is provided between the bolt 130 and the component to be clamped (not shown) where the hydraulic jack 150, which has a puller bar (not shown) operable to engage the tapered thread 132 in the nut 130 and has a bridge 151 which engages the peripheral flange 113 on the second spacer ring 112. When the hydraulic jack 150 has tensioned the bolt by applying a tensile load to the nut 130, the first spacer ring 111 is rotated relative to the second spacer ring 112, eg., by the engagement of a tool in hole(s) 124, or by the compression coil springs (not shown), to move the expanding spacer 110 to its expanded position, ie., from the position shown in FIGS. 3(c) and (d) where the abutment faces 118, 119 are engaged, to the expanded position shown in FIGS. 3(e) and (f) where the abutment faces 118, 119 are spaced apart.

The skilled addressee will appreciate that the expanding spacer 110 enables the strain gap between the planar end face 134 of the nut 130 and the component to be quickly taken up.

In the third embodiment in FIGS. 4(a) to (d), the nut 230 has a planar end face 234 and does not extend into the bores of the spacer rings 211, 212 of the expanding spacer 210. In this embodiment, the spacer rings 211, 212 are maintained co-axially by the bolt about which the expanding spacer 210 is mounted. When the nut 230 is engaged by the pulling bar of the hydraulic jack 250, the first spacer ring 211 is rotated relative to the second spacer ring 212 to enable the expanding spacer 210 to take up the strain gap between the nut and the component to be clamped.

As shown in FIGS. 5(a) to (d), the hydraulic ram 250 has a detachable bridge 251 which is placed around the nut 230, the bridge spanning the peripheral flange 213 on the second spacer ring 212 of the expanding spacer 210 and an annular end face 252 on the body of the hydraulic jack 250.

Referring to the fourth embodiment shown in FIGS. 6(a) to (d), one end of the nut 330 is provided with the helically ramped faces 316 and abutment faces 318 corresponding to the first spacer ring 11 of the expanding spacer 10; while a spacer ring 312 has complementary helically ramped faces 317 and abutment faces 319. An annular collar is received in bores 322, 323 to maintain the nut 330 and the spacer ring 312 in co-axial alignment.

NB: In this embodiment, the spacer ring 312 does not incorporate a peripheral flange; and holes 324 are provided around the top of the nut 330 to enable rotation of the nut 330 relative to the spacer ring 312 to move the expanding spacer 310 between its expanded and collapsed positions.

FIGS. 7(a) to (d) illustrate a fifth embodiment where the nut 430 has an externally tapered thread 432 to engage a complementary thread on a puller bar 455 of the hydraulic jack 450 and where the bridge 451 of the hydraulic jack 450 bears directly on the component to be clamped (not shown).

As hereinbefore described, the annular collar 421 maintains the nut 430 and the spacer ring 412 of the expanding spacer 410 in correct co-axial alignment.

Figure 8:
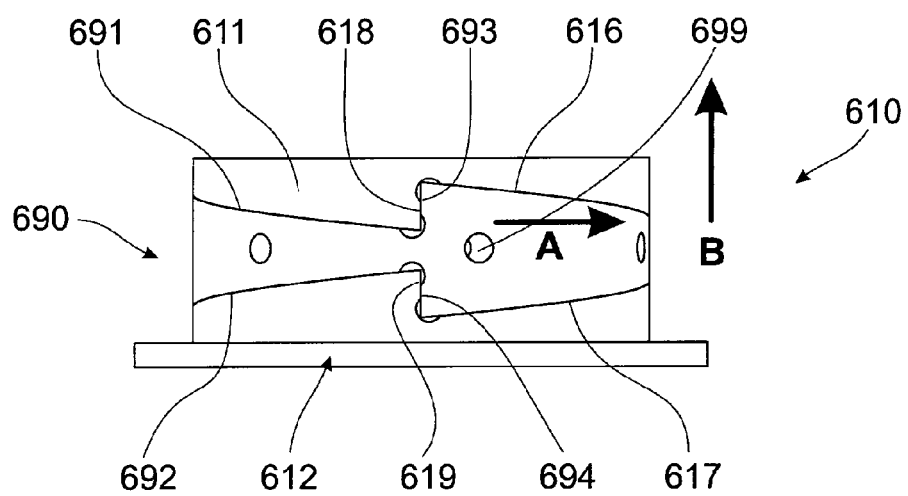
FIG. 8 is a side elevational view of a sixth embodiment, having an intermediate spacer ring.

In a sixth embodiment shown in FIG. 8, the expanding spacer 10 has an intermediate spacer ring 690 may be provided between the first and second spacer rings 611, 612 where the intermediate spacer ring 690 has opposed helically ramped faces and abutment faces 693, 694 complementary to the helically ramped faces 616, 617 and abutment faces 618, 619 of the first and second spacer rings 611, 612. The "top" side of the intermediate spacer ring 690 would have helically ramped faces 691 and abutment faces 693 arranged to co-operate with the helically ramped faces 616 and abutment faces 618 of the first spacer ring 611; and the "bottom" side of the intermediate spacer ring 690 would have helically ramped faces 692 and abutment faces 694 complementary to the helically ramped faces 617 and abutment faces 619 of the second spacer ring 612.

One advantage of the intermediate spacer ring 690 is that for each 1° of rotation of the intermediate spacer ring 690 (in the direction of arrow A) relative to the first and second spacer rings 611, 612 the expanding spacer 610 actually expands at a rate double (in the direction of Arrow B) for the same 1° of relative rotation between the first and second spacer rings 11, 12 of spacer 10.

The intermediate spacer ring 690 may be rotated relative to the spacer rings 611, 612 by inserting a tool in spaced holes 699.

Where such an intermediate spacer ring 690 is used, it is preferred that the first spacer ring 611, intermediate spacer ring 690 and second spacer ring 612 are maintained in axial alignment by an annular collar (=annular collar 21) or by an annular extension (=annular extension 113 on nut 130 of FIGS. 2(a) to (c)).

The actual angle of inclination of the helically ramped faces relative to the planar end faces of the end spacers can be varied, but will normally be relatively shallow, ie., less than 25°, so that when the compressive load is applied to the expanding spacers, ie., when the hydraulic jacks release their tension on the nuts, the friction generated between the opposed helically ramped faces of the first and second spacer rings, or of the nut and of the spacer ring, and/or the intermediate spacer ring, will prevent relative rotational motion between the adjacent components. In this way, the strain gap between the nut and the component to be clamped will be maintained.

While the embodiments have shown three helically ramped faces on the spacer ring(s) and/or nut, it will be readily apparent to the skilled addressee that one or more helically ramped faces may be used with a preference of a minimum of two, and a preference of no more than four.

FIGS. 9(a) to (e) illustrate a seventh embodiment of the expanding spacer 710, having a nut 730 and spacer ring 712.

The nut 730 has a body 732 central bore with internal screw threads 733 engageable with the bolt to be tensioned, not shown. The upper end of the body 732 has external screw threads 731 engageable with a puller bar (not shown) of a hydraulic jack (of the type illustrated with respect to other embodiments); while the lower end of the body 732 has external screw threads 736 complementary with internal screw threads 713 in the body 714 of the spacer ring 712. The body 714 has a planar annular bottom face 715 and an abutment face 716 formed by an inwardly directed circumferential flange 717. The annular bottom face 715 and an annular top face 718 on the body 714 are engageable by complementary annular faces 737, 738 on the body 732 of the nut 730.

The spacer ring 712 can be rotated relative to the nut 730 using a tool engaged in the spaced holes 724 in the spacer ring 712. In operation, the expanding spacer 710 is engaged with the bolt to be tensioned, and the nut 730 is connected thereto by the internal threads 733. The spacer 710 is in the configuration shown in FIG. 7(d).

A puller bar, with a tapered female thread, of a hydraulic jack is engaged with the external threads 731 on the nut 730.

Figure 9A:
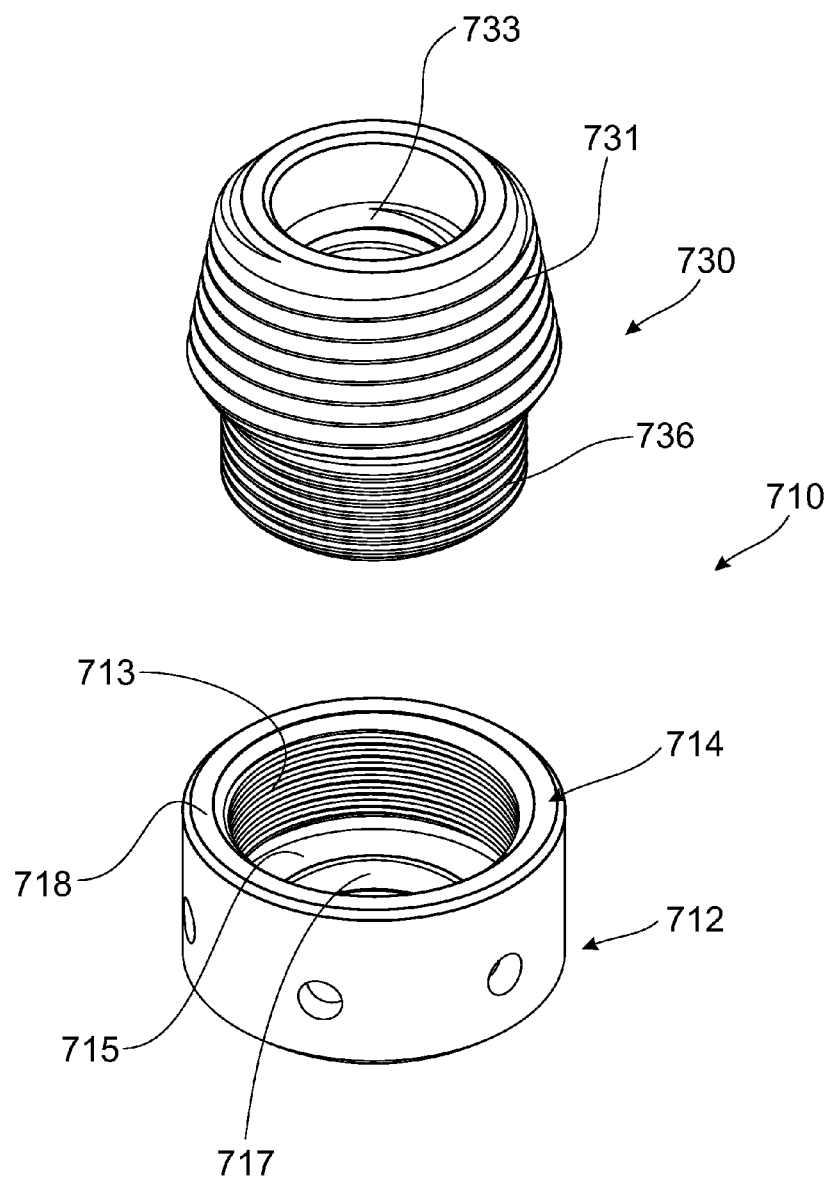
FIGS. 9(a) to (e) show perspective and part-sectional views of a seventh embodiment.
Figure 9B:
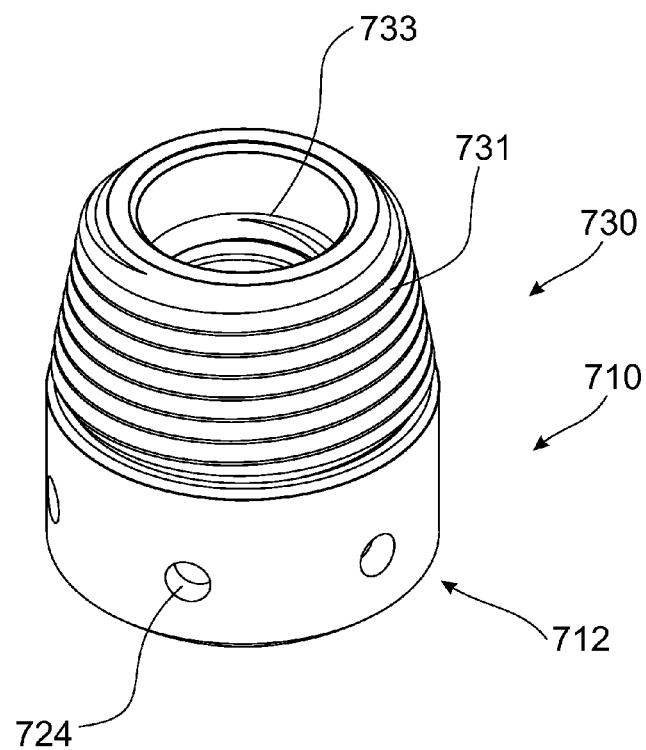
Figure 9C:
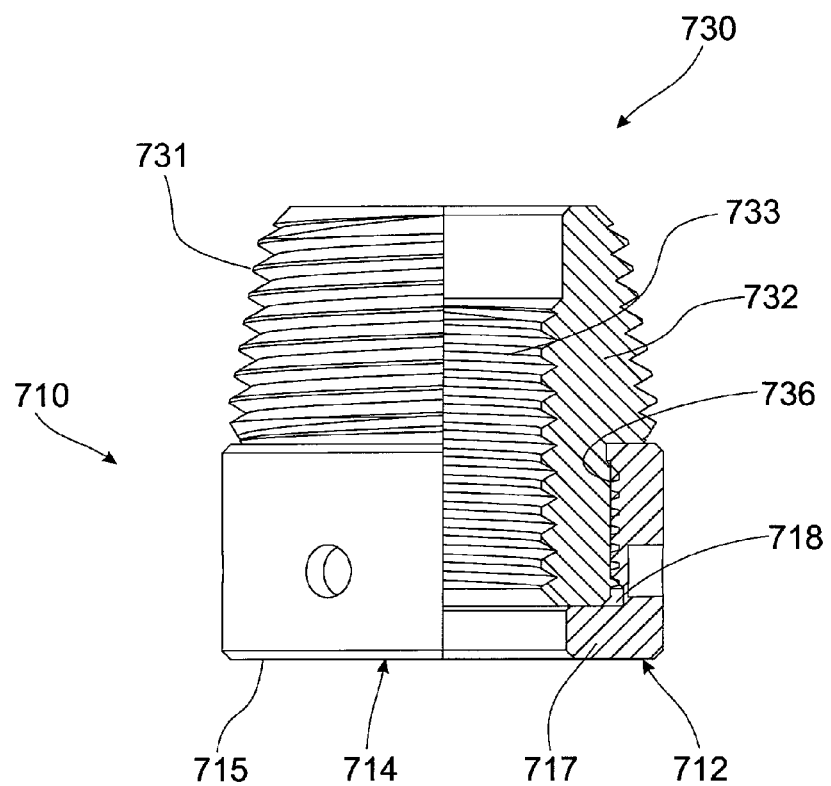
Figure 9D:
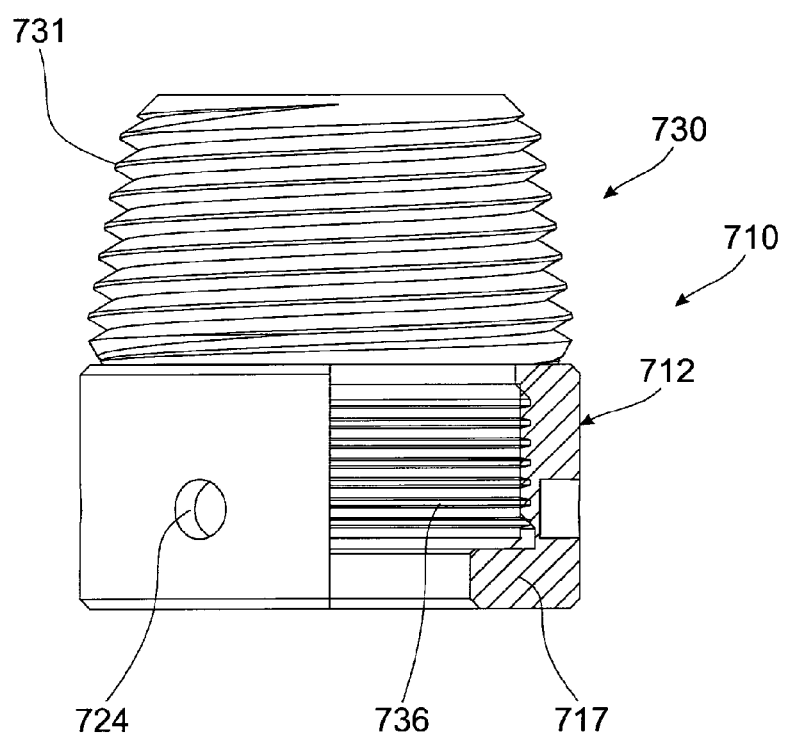
Figure 9E:
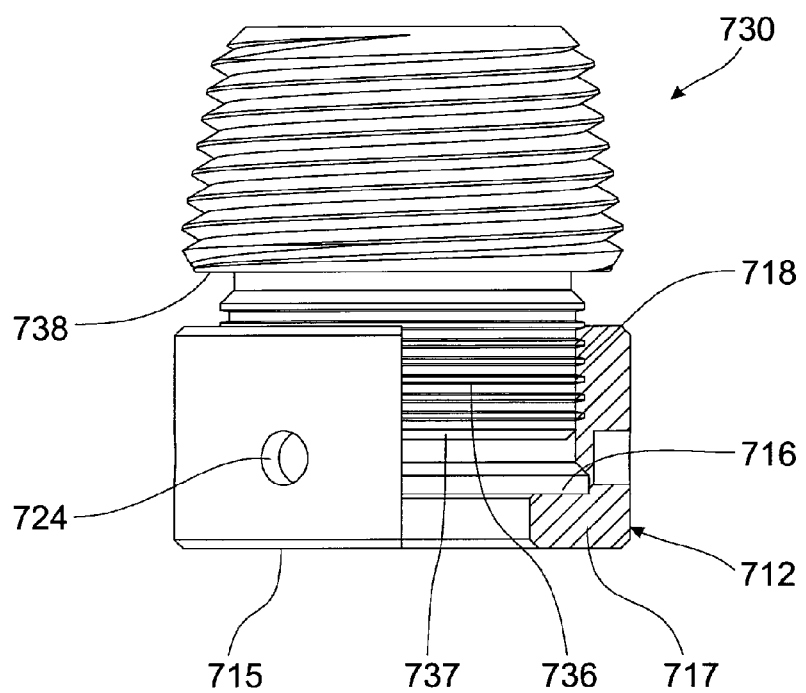

When the bolt has been tensioned, a tool is engaged with the holes 724 in the spacer ring 712, which is rotated relative to the nut 730 until the annular face 715 on the spacer ring engages the component to be clamped—see FIG. 9(e)—to take up the strain gap.

The puller bar is then released.

To de-tension the bolt, the procedure is reversed.

The actual configuration of the expanding spacers can be varied to suit the particular intended application.

Various changes and modifications may be made to the embodiments described and illustrated without departing from the present invention.

The invention claimed is:

1. An expanding spacer, to be mounted about a bolt being tensioned, incorporating a nut engageable with the bolt, and a rotatable spacer ring with a planar end face engageable with a component to be clamped, the nut and the rotatable spacer ring having complementary helically ramped faces terminated by abutment faces, and holes in the rotatable spacer ring for engagement by a tool to selectively rotate the spacer ring to an expanded position having the complementary helically ramped faces engaged in expanded positions, wherein the bolt is being tensioned and wherein the angle of inclination of each of the ramped faces to the planar end face of the rotatable spacer ring is selected so there will be no relative rotation or motion between the nut and the rotatable spacer ring while the expanding spacer is subject to an applied compressive load.

2. An expanding spacer as claimed in claim 1, wherein:
an intermediate spacer ring is interposed between the nut and the rotatable spacer ring, the intermediate spacer ring having oppositely-directed helically ramped faces terminated by abutment faces, where the inclination of the respective helically ramped faces is selected so that there will be no relative rotational motion between the intermediate spacer ring and the nut and the rotatable spacer ring, when the expanding spacer is subject to a compressive load.

3. An expanding spacer as claimed in claim 1, wherein:
an annular collar is provided within the expanding spacer to maintain the nut and rotatable spacer ring in axial alignment, as the compressive load is applied to the expanding spacer.

4. An expanding spacer as claimed in claim 1, wherein:
respective abutment faces lie on an axis perpendicular to the plane of the planar end face; and said holes in the rotatable spacer ring for engagement by the tool to selectively rotate the rotatable spacer ring between said expanded position wherein the bolt is being tensioned, and a collapsed position wherein tension on the bolt is released and the nut is enabled to be rotated on the bolt to release the tension further.

5. An expanding spacer as claimed in claim 1, wherein:
at least one compression spring is mounted in, and extends from, the abutment faces to urge the expanding spacer to the expanded position.

6. An expanding spacer as claimed in claim 1, wherein:
the spacer ring is provided with two or more, and no more than four, helically ramped faces.

7. An expanding spacer as claimed in claim 6 wherein:
an angle of inclination of each of the helically ramped faces to the corresponding planar end is about 13° to about 25°.

8. An expanding spacer as claimed in claim 1 wherein:
a peripheral flange is provided around the spacer ring to bear on the component and to engage a bridge of a hydraulic jack operable to tension the bolt.

9. An expanding spacer as claimed in claim 1, wherein:
an annular collar is provided within the expanding spacer to maintain the nut and spacer ring in axial alignment, as the compressive load is applied to the expanding spacer.

10. An expanding spacer as claimed in claim 1, wherein:
said holes in the rotatable spacer ring are for engagement by the tool to selectively rotate the rotatable spacer ring between said expanded position wherein the bolt is being tensioned, and a collapsed position wherein tension on the bolt is released and the nut is enabled to be rotated on the bolt to release the tension further.

11. An expanding spacer as claimed in claim 1, wherein:
at least one compression spring is mounted in, and extends from, the abutment faces to urge the expanding spacer to the expanded position.

12. An expanding spacer as claimed in claim 1, wherein:
the spacer ring is provided with, two, three or four helically ramped faces.

13. An expanding spacer as claimed in claim 1 wherein:
a peripheral flange is provided around the spacer ring to bear on the component and a bridge of a hydraulic jack operable to tension the bolt.

* * * * *